United States Patent
Godfrey

(10) Patent No.: US 11,338,737 B2
(45) Date of Patent: May 24, 2022

(54) COMPOSITE BUSHING WITHIN THE ARB PIVOT PIN LOCATIONS, INTEGRATED INTO AUTOMATED RUNNING BOARD

(71) Applicant: Magna Exteriors Inc., Concord (CA)

(72) Inventor: Jerry Godfrey, Schomberg (CA)

(73) Assignee: MAGNA EXTERIORS, INC., Concord (CA)

( * ) Notice: Subject to any disclaimer, the term of this patent is extended or adjusted under 35 U.S.C. 154(b) by 224 days.

(21) Appl. No.: 16/707,322

(22) Filed: Dec. 9, 2019

(65) Prior Publication Data

US 2020/0180512 A1    Jun. 11, 2020

Related U.S. Application Data

(60) Provisional application No. 62/776,760, filed on Dec. 7, 2018.

(51) Int. Cl.
*B60R 3/02* (2006.01)
*B60R 3/00* (2006.01)

(52) U.S. Cl.
CPC ............... *B60R 3/02* (2013.01); *B60R 3/002* (2013.01)

(58) Field of Classification Search
CPC .................................. B60R 3/02; B60R 3/002
See application file for complete search history.

(56) References Cited

U.S. PATENT DOCUMENTS

| | | | | |
|---|---|---|---|---|
| 3,870,589 A | * | 3/1975 | Shobert | F16C 33/201 384/300 |
| 9,393,621 B2 | * | 7/2016 | Sato | F16C 33/046 |
| 2003/0132595 A1 | * | 7/2003 | Fabiano | B60R 3/002 |
| 2008/0271936 A1 | * | 11/2008 | Kuntze | F16C 11/0638 384/206 |
| 2015/0147012 A1 | * | 5/2015 | Scancarello | F16C 33/121 384/322 |
| 2015/0204383 A1 | * | 7/2015 | Ishii | F04B 53/14 384/297 |
| 2015/0323007 A1 | * | 11/2015 | Sato | B22F 7/06 384/154 |

* cited by examiner

*Primary Examiner* — Bryan A Evans
(74) *Attorney, Agent, or Firm* — Warn Partners P.C.

(57) ABSTRACT

A movable link arrangement for an active exterior component on a vehicle. The movable link arrangement has several links that are connected together and rotate about a composite bushing. The composite bushing has a body with an aperture formed there through. The body is formed of a continuous fiber and resin material that circumscribes an inner layer of friction reducing material that forms a bore through the body of the composite bushing. A rotatable pin is positioned through that aperture of the body and extends through the bore so that the rotatable pin is in contact with the inner layer. The composite bushing with the friction reducing material provides reduced noise and eliminates unwanted corrosion that occurs when other bushing materials are used.

24 Claims, 5 Drawing Sheets

COMPOSITE BUSHING WITHIN THE ARB PIVOT PIN LOCATIONS, INTEGRATED INTO AUTOMATED RUNNING BOARD

FIELD OF THE INVENTION

The present invention relates to a movable link arrangement having composite bushings at the pivot locations between the links.

BACKGROUND OF THE INVENTION

In the automotive field there has been an increased demand for providing exterior components that are movable or "active" in that the component will move between a deployed and undeployed position. One particular example is a vehicle running board that will move to a deployed position making the step visible and usable to a person entering or exiting the vehicle. The active running board will also retract to a retracted position where the step is no longer visible and stowed away when not needed, thereby making the vehicle more aerodynamic by placing the step closer to the vehicle body. Other examples of active exterior components include movable spoilers, tailgate steps and active underbody air dams. All of the active exterior components have some type of linkage that allows the component to move between the retracted and deployed positions. These linkages typically have several pieces that pivot relative to one another at various pivot points or axis points. Also, the linkages are exposed to the environment outside of the vehicle and can experience corrosion due to the presence of moisture, salt or other chemicals found externally to the vehicle. Additionally, dirt, dust or other particles can contaminate the area of the linkage. The corrosion and contamination at the pivot points can cause failure of the linkage or at times can cause the linkage to squeak or make undesirable sounds. It is therefore desirable to develop movable link arrangements that resist corrosion. It is further an object of the invention to provide a movable link arrangement that resists or accommodates dirt, debris or other unwanted materials thereby preventing unwanted sounds as the linkage moves between the deployed and stowed positions.

SUMMARY OF THE INVENTION

The present invention is directed to a movable link arrangement for an active exterior component on a vehicle. Examples of active exterior components include running boards, tailgate steps, underbody air deflectors and spoilers. The vehicle exterior component is connected to a vehicle body through at least one movable link arrangement that connects between the vehicle body and the vehicle exterior component. The movable link arrangement component moves the vehicle exterior component to any position between a fully extended position and a retracted position. The movement of the movable link arrangement is accomplished using an actuator that is connected to the at least one movable link arrangement for driving the movable link arrangement and the vehicle exterior component between the fully extended position in the fully retracted position.

Each movable link arrangement includes a fixed link connected to the vehicle body and a base link connected to the vehicle exterior component. Each movable link arrangement further includes a driven link pivotally connected between the base link in the fixed link such that the driven link has at least two driven link connections. The movable link arrangement also includes a follower link pivotally connected between the base link and the fixed link. The follower link has at least two follower link connections. Each one of the driven link connections and follower link connections all include a composite bushing and pin that creates the connection. The composite bushing has a body with an aperture formed therethrough. The body is formed of a continuous fiber and resin material that circumscribes an inner layer of friction reducing material. The friction reducing material forms a passage or bore through the composite bushing. A rotatable pin is positioned through the aperture of the body and extends through the passage or bore formed in the inner layer of friction reducing material. The pin can be formed of any type of material; however, it is within the scope of this invention for the pin to be a steel pin, but can also be formed of aluminum plastic or other suitable material.

The composite bushing can withstand all the requirements and the application eliminates the potential of corrosion happening between the stainless-steel pin and the cast aluminum link allowing the system to last the life of the vehicle and reduce warranty cost for OEMs.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Referring now to all of the figures a movable link arrangement 10 for an active exterior component 12 for a vehicle is shown. The Figures show the active exterior component 12 as a running board, however it is within the scope of this invention for the active exterior component to be any type of movable exterior component including, but not limited to tailgate steps, underbody air deflectors such as front air dams, side air dams or rear air dams as well as rear spoilers. The vehicle exterior component 12 is connected to a vehicle body 14 through at least one movable link 16 that connects between the vehicle body 14 and the vehicle exterior component 12. The movable link 16 component moves the vehicle exterior component 12 to any position between a fully extended position where the vehicle exterior component is positioned away from the vehicle body 14 to be in use and a retracted position where the vehicle exterior component 12 is positioned adjacent to or close to the vehicle body 14 compared to the extended position.

Figure 1:
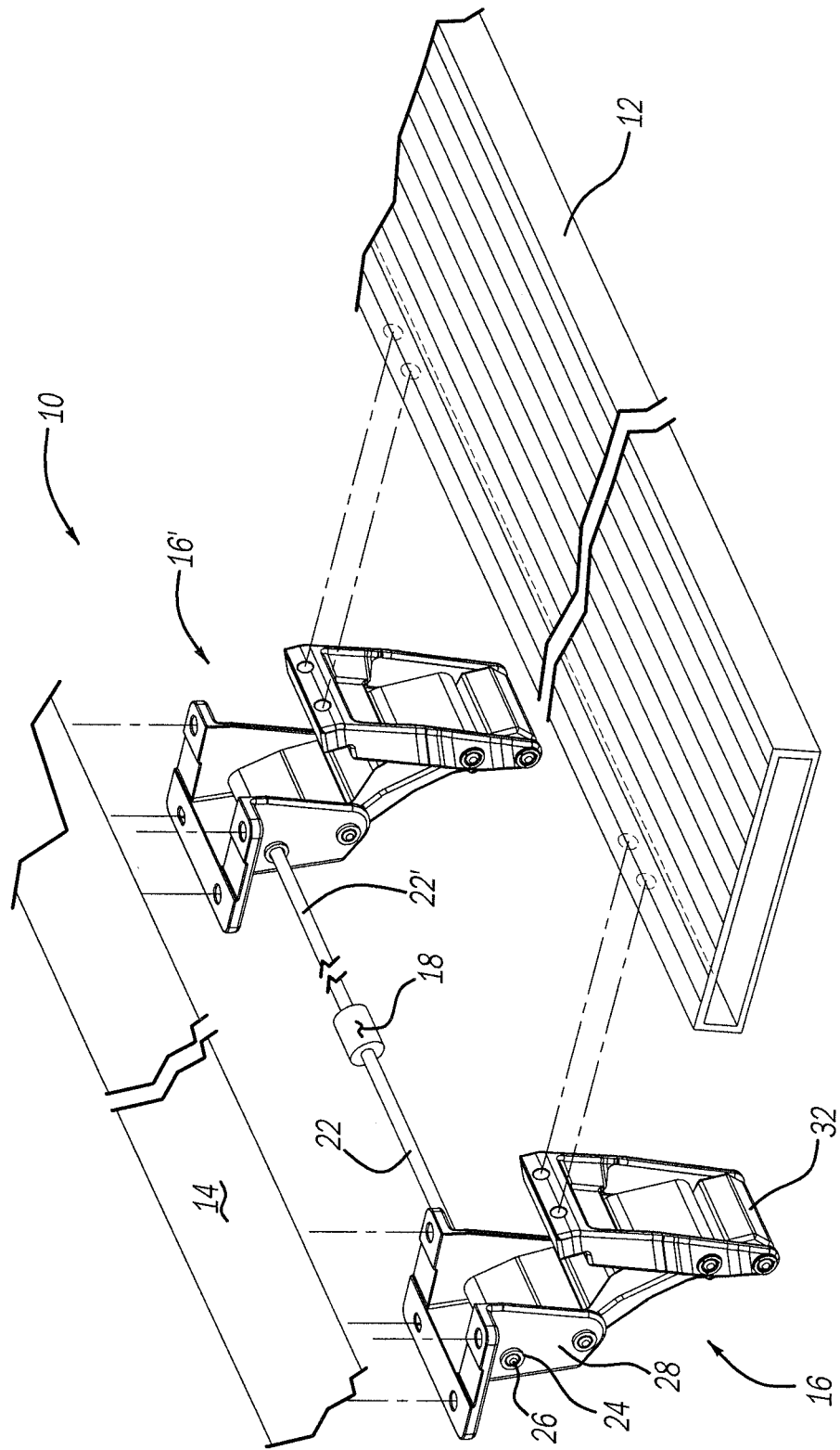
FIG. 1 is an exploded side perspective view of the movable link arrangement used to connect a running board to a vehicle.
Figure 2:
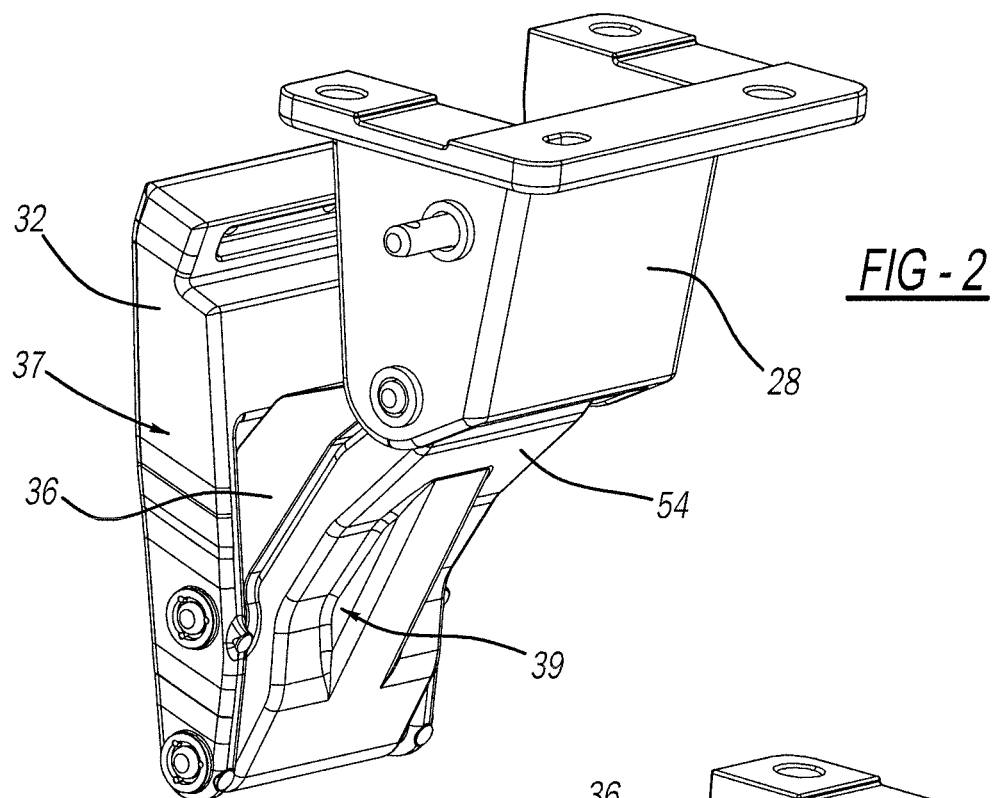
FIG. 2 is a side perspective view of the movable link.
Figure 3:
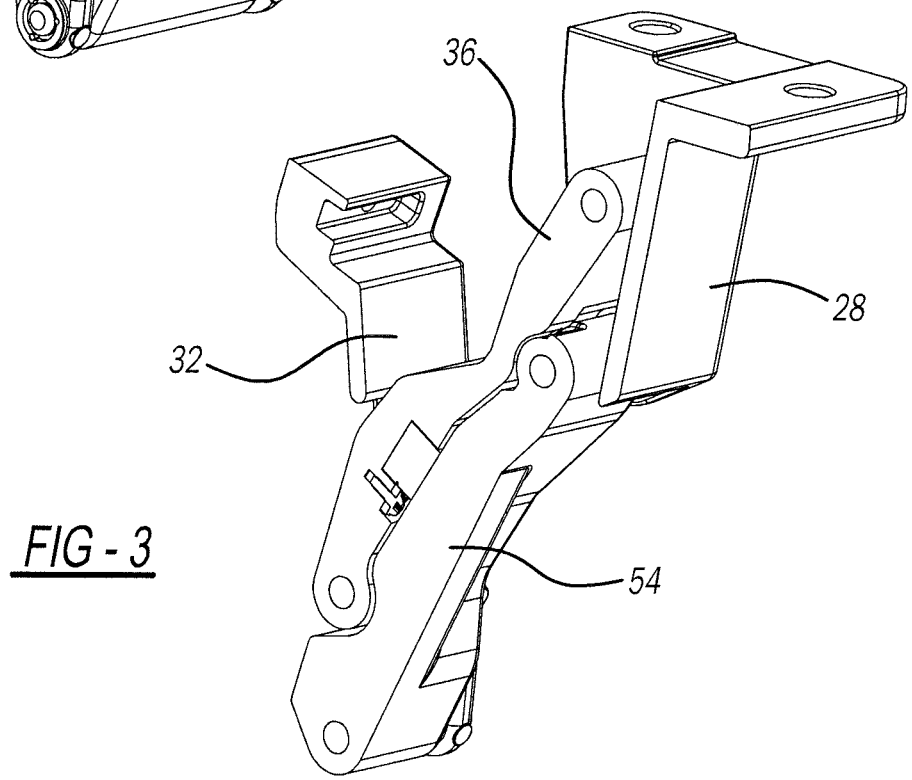
FIG. 3 is a side cross-sectional perspective view of the movable link.

The movement of the movable link 16 is accomplished using an actuator 18 that is connected to the at least one movable link 16 for driving the movable link 16 and the vehicle exterior component 12 between the fully extended position and the fully retracted position. The actuator 18 is shown schematically and can take many forms. For example, the actuator 18 can be contained within the movable link 16, act directly on the movable link 16 using gears or direct movement of a motor stator that moves an upper drive pin 50. The actuator 18 can also be positioned externally to the movable link 16 and causes movement of the movable link 16 using an actuator connection 22, which is a drive shaft, cable or other suitable component that is part of or connects to an upper drive pin 50 rotatably disposed through a bushing 24. This type of configuration allows the actuator 18 to be connected to drive more than one movable link such as the second movable link 16' shown in FIG. 1.

The movable link 16 includes a fixed link 28 with pivot apertures 30, 30' to which the other components of the movable link 16 connect and pivot with respect to the fixed link 28. The fixed link 28 connects to the vehicle body 14.

The movable link 16 also includes a base link 32 connected to the vehicle exterior component 12 using fasteners extending through apertures formed on the based link 32. The base link 32 also includes pivot apertures 34, 34' to which other components of the movable link 16 connect and pivot with respect to the base link 32.

Each movable link arrangement 10 further includes a driven link 36 pivotally connected between the fixed link 28 and the base link 32 using at least two driven link connections 37. The at least two driven link connections 37 as shown includes using upper apertures 38, 38' used with the upper drive link pin 50 for connecting the driven link 36 to the fixed link 28. The at least two driven link connections 37 also include lower apertures 40, 40' used with a lower drive link pin 52 for connecting the driven link 36 to the base link 32. During operation the driven link 36 pivots about the upper drive link pin 50 and the base link 32 pivots about the lower drive link pin 52.

A follower link 54 is pivotally connected between the fixed link 28 and the base link 32 by at least two follower link connections 39. The follower link connections 39 include upper apertures 56, 56' on the follower link 54 connected to the fixed link 28 using an upper follower link pin 60 and lower apertures 58, 58' on the follower link 54 connect to the base link 32 using a lower follower link pin 62. During operation the follower link 54 pivots about the upper follower link pin 60 and the base link 32 pivots about the lower follower link pin 62.

Figure 4:
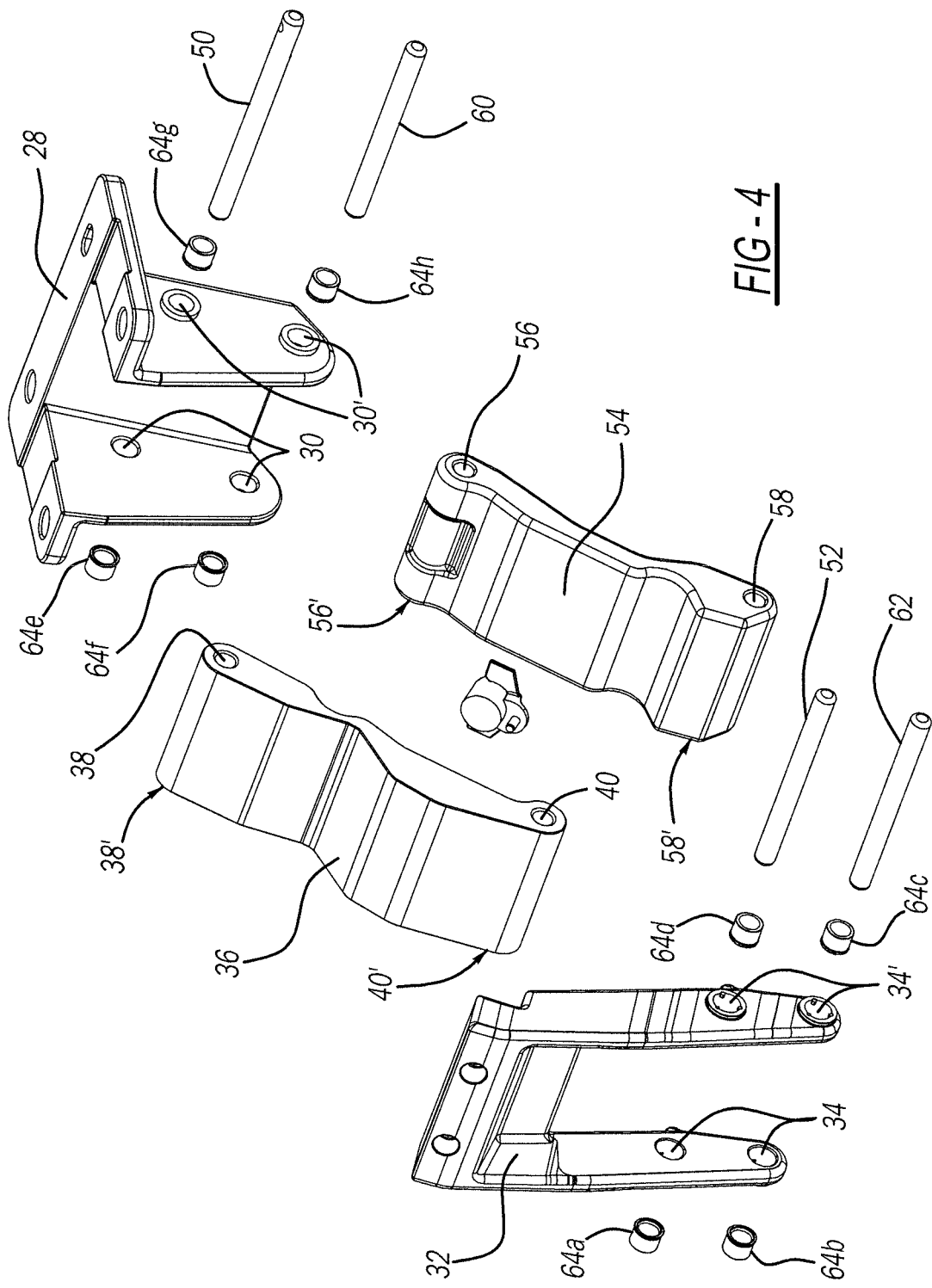
FIG. 4 is an exploded perspective view of the movable link.
Figure 5:
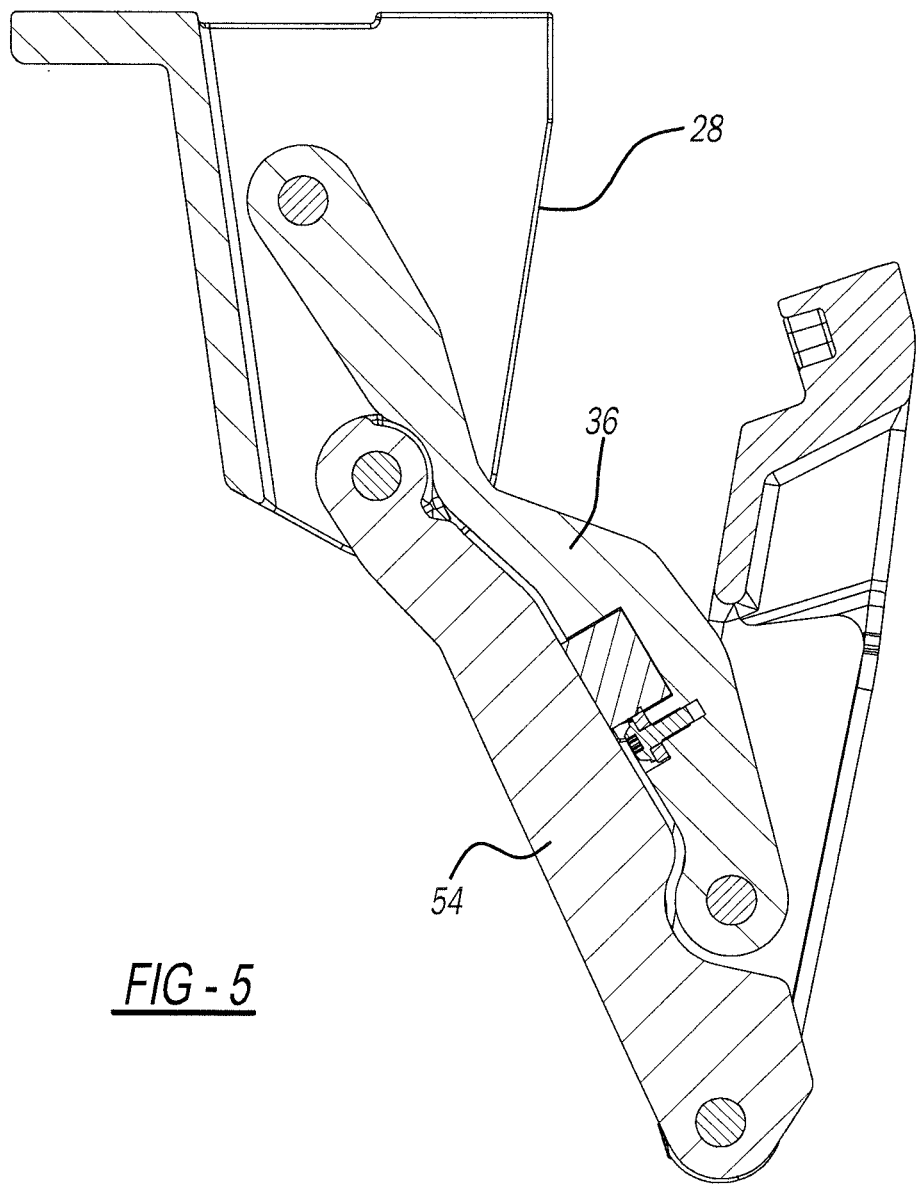
FIG. 5 is a side cross-sectional plan view of the movable link.
Figure 6:
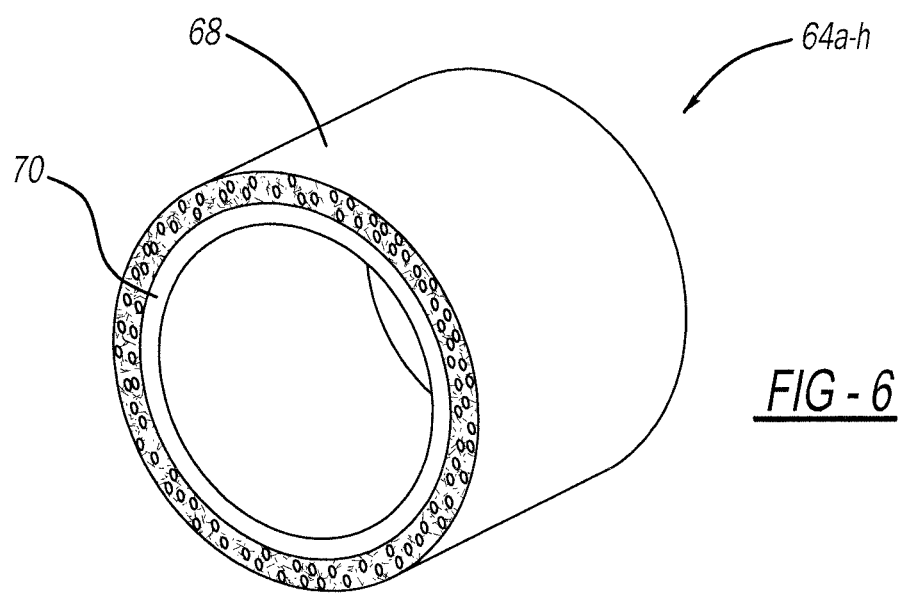
FIG. 6 is a side perspective view of a composite bushing of the movable link.
Figure 7:
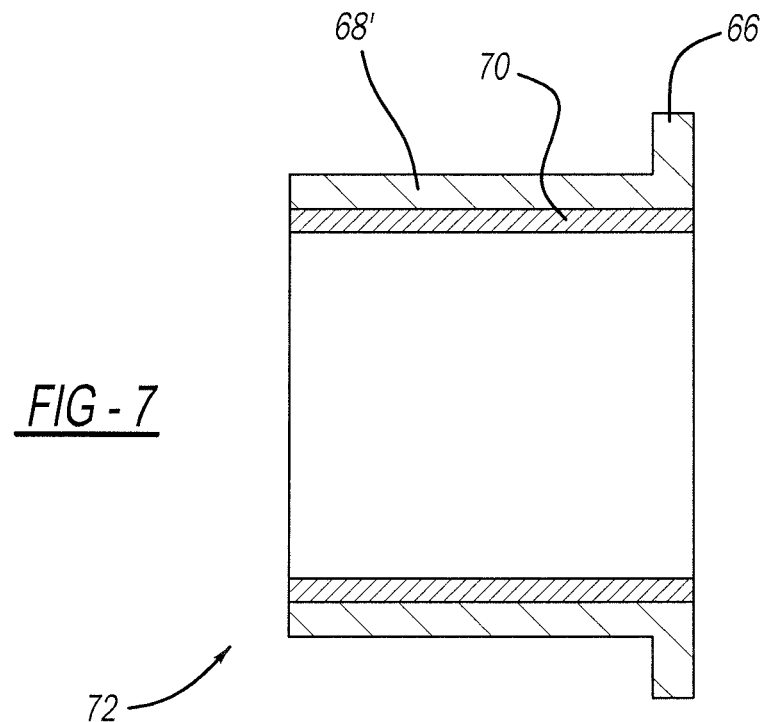
FIG. 7 is a cross sectional plan view of the composite bushing of the movable link.

Each of the driven link connections 37 and follower link connections 39 all include a composite bushing 64 that the respective upper link drive pin 50, lower link drive pin 52, upper follower link pin 60 or lower follower link pin 62 extend through. Each of the upper link drive pin 50, lower link drive pin 52, upper follower link pin 60 and lower follower link pin 62 are typically made of metal such as stainless steel, aluminum or other material. If the bushing between the pin and the housing is made of metal is will corrode over time causing unwanted noise and poor movement performance of the movable link 16. Referring now to FIG. 6 the details of the composite bushing 64 and FIG. 7 the details of an alternate embodiment of a composite bushing 72 are shown. Composite bushing 72 differs from composite bushing 64 in that a body 68' of composite bushing 72 includes a flange 66 formed thereon for preventing over insertion of the composite bushing 72 in to the various apertures of the movable link 16. The composite bushings 64a-h shown in FIG. 4 can be replaced with the composite bushing 72, shown in FIG. 7 and will prevent the flange 66 will prevent the composite busing 72 from being over inserted into one of the pivot apertures 30, 30', 34, 34' shown in FIG. 4.

Both composite bushings 64, 72 includes a body 68,68' that is a filament reinforced resin body that has continuous fiber and resin material that circumscribes an inner layer 70. The continuous fiber can be any suitable fiber such as polyparaphenylene terephthalamide, carbon fiber, glass fiber or other suitable fibers. The resin material is epoxy, but could also be polyurethane or other suitable resins depending on the application and type of continuous fiber used. The inner layer 70 is a low friction material such as, but not limited to polytetrafluoroethylene or other low friction materials. The inner layer 70 helps eliminate or reduce any noise between the bushing and the pin, while the material of the body 68, 68' provides strength and resists corrosion. In a preferred application, the composite bushing 64, 72 is a thermosetting, filament reinforced resin body 68, 68' with a woven PTFE liner or inner layer 70. The liner material is low friction material that offers a low wear properties. The bushing material can withstand loads up to 35,000 psi with very low thermal expansion properties. The composite bushing 64, 72 can withstand all the design requirements eliminate the potential of corrosion happening between the stainless-steel pin and cast aluminum link allowing the system to last the life of the vehicle and reduce warranty cost for OEMs.

The composite bushing 64, 72 is press fit into the respective one of the pivot apertures 30, 30', 34, 34' with a clearance between the outer diameter of the composite bushing and the body or casting of the fixed link 28 or base link 32. The clearance between the composite bushing and the body or casing is generally less than 0.005 inches, less than 0.004 inches; or one of the following ranges, a range of about 0.0005 inches to about 0.005 inches and a range of about 0.0015 inches to about 0.004 inches. The clearance between the inner diameter of the composite bushing 64, 72 and the respective upper drive link pin 50, lower drive link pin 52, upper follower link pin 60 and lower follower link pin 62 is generally less than about 0.002 inches. In some embodiments is one of the following ranges, between about 0 to about 0.004 inches, about 0 to about 0.003 inches and about to about 0.002 inches.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A moveable link arrangement for an active exterior component on a vehicle comprising:
   a vehicle exterior component;
   a vehicle body;
   at least one moveable link arrangement connected between the vehicle body and the vehicle exterior component for moving the vehicle exterior component to any position between a fully extended position and retracted position;

a fixed link of the at least one movable link arrangement connected to the vehicle body;
a base link of the at least one movable link arrangement connected to the vehicle exterior component;
a driven link of the at least one movable link arrangement pivotally connected between the base link and the fixed link, wherein the driven link has at two driven link connections; and
wherein each at least two driven link connections each include a composite bushing having a body with an aperture formed there through, the body being formed of a continuous fiber and a resin material that circumscribes an inner layer of friction reduced material and a rotatable pin positioned through the aperture of the body in contact with the inner layer'
wherein the continuous fiber is one selected from the group consisting essentially of polyparaphenylene terephthalamide, carbon fiber, glass fiber and combinations thereof, and
wherein the resin material is one selected from the group consisting essentially of epoxy polyurethane and combinations thereof.

2. The movable link arrangement of claim 1, wherein the vehicle exterior component is one selected from the group consisting of a running board, step, spoiler and underbody air deflector.

3. The movable link arrangement of claim 1, wherein the inner layer of friction reduced material is polytetrafluoroethylene.

4. The movable link arrangement of claim 1, wherein the body of the composite bushing has a flange extending perpendicular to the aperture.

5. The moveable link arrangement of claim 1 further comprising:
an actuator connected to the at least one movable link arrangement for driving the movable link arrangement and the vehicle exterior component between the fully extended position and the fully retracted position.

6. The moveable link arrangement of claim 5 wherein the actuator is connected to the rotatable pin of one of the at least two driven link connections.

7. The moveable link arrangement of claim 1 further comprising:
a follower link of the at least one movable link arrangement pivotally connected between the base link in the fixed link, wherein the follower link has at least two follower link connections; and
wherein each at least two follower link connections each include a composite bushing having a body with an aperture formed there through, the body being formed of a continuous fiber and a resin material that circumscribes an inner layer of friction reduced material and a rotatable pin positioned through the aperture of the body in contact with the inner layer.

8. A moveable link arrangement for an active exterior component on a vehicle comprising:
a vehicle exterior component;
a vehicle body;
at least one moveable link arrangement connected between the vehicle body and the vehicle exterior component for moving the vehicle exterior component to any position between a fully extended position and retracted position;
an actuator connected to the at least one movable link arrangement for driving the movable link arrangement and the vehicle exterior component between the fully extended position and the fully retracted position;
a fixed link of the at least one movable link arrangement connected to the vehicle body;
a base link of the at least one movable link arrangement connected to the vehicle exterior component;
a driven link of the at least one movable link arrangement pivotally connected between the base link and the fixed link, wherein the driven link has at two driven link connections;
a follower link of the at least one movable link arrangement pivotally connected between the base link in the fixed link, wherein the follower link has at least two follower link connections;
wherein each at least two driven link connections, at least two follower link connections all include a composite bushing having a body with an aperture formed there through, the body being formed of a continuous fiber and a resin material that circumscribes an inner layer of friction reduced material and a rotatable pin positioned through the aperture of the body in contact with the inner layer, and
at least one actuator to driven link connection that includes an actuator composite bushing having a body with an aperture formed there through, the body being formed of a continuous fiber and resin material that circumscribes an inner layer of friction reduced material and a rotatable pin positioned through the aperture of the body in contact with the inner layer.

9. The movable link arrangement of claim 8, wherein the vehicle exterior component is one selected from the group consisting of a running board, step, spoiler and underbody air deflector.

10. The movable link arrangement of claim 8, wherein the inner layer of friction reduced material is polytetrafluoroethylene.

11. The movable link arrangement of claim 8, wherein the body of the composite bushing has a flange extending perpendicular to the aperture.

12. The moveable link arrangement of claim 8 wherein the continuous fiber is one selected from the group consisting essentially of polyparaphenylene terephthalamide; carbon fiber, glass fiber and combinations thereof.

13. The moveable link arrangement of claim 12 wherein the resin material is one selected from the group consisting essentially of epoxy polyurethane and combinations thereof.

14. A moveable link arrangement for an active exterior component on a vehicle comprising:
a vehicle exterior component;
a vehicle body;
at least one moveable link arrangement connected between the vehicle body and the vehicle exterior component for moving the vehicle exterior component to any position between a fully extended position and retracted position;
a fixed link of the at least one movable link arrangement connected to the vehicle body;
a base link of the at least one movable link arrangement connected to the vehicle exterior component;
a driven link of the at least one movable link arrangement pivotally connected between the base link and the fixed link, wherein the driven link has at two driven link connections; and
wherein each at least two driven link connections each include a composite bushing having a body with an aperture formed there through, the body being formed of a continuous fiber that is one selected from the group consisting essentially of polyparaphenylene terephthalamide, carbon fiber, glass fiber and combinations thereof, and a resin material is one selected from the group consisting essentially of epoxy polyurethane and combinations thereof, wherein the continuous fiber and resin material circumscribe an inner layer of friction reduced material and a rotatable pin positioned through the aperture of the body in contact with the inner layer.

15. The movable link arrangement of claim 14, wherein the inner layer of friction reduced material is polytetrafluoroethylene.

16. The movable link arrangement of claim 14, wherein the body of the composite bushing has a flange extending perpendicular to the aperture.

17. The moveable link arrangement of claim 16 wherein the continuous fiber is one selected from the group consisting essentially of polyparaphenylene terephthalamide, carbon fiber, glass fiber and combinations thereof wherein the resin material is one selected from the group consisting essentially of epoxy polyurethane and combinations thereof.

18. The moveable link arrangement of claim 14 further comprising:
   an actuator connected to the at least one movable link arrangement for driving the movable link arrangement and the vehicle exterior component between the fully extended position and the fully retracted position.

19. The movable link arrangement of claim 18 wherein the actuator is connected to the rotatable pin of one of the at least two driven link connections.

20. The moveable link arrangement of claim 14 further comprising:
   a follower link of the at least one movable link arrangement pivotally connected between the base link in the fixed link, wherein the follower link has at least two follower link connections; and
   wherein each at least two follower link connections each include a composite bushing having a body with an aperture formed there through, the body being formed of a continuous fiber and a resin material that circumscribes an inner layer of friction reduced material and a rotatable pin positioned through the aperture of the body in contact with the inner layer.

21. A moveable link arrangement for an active exterior component on a vehicle comprising:
   a vehicle exterior component;
   a vehicle body;
   at least one moveable link arrangement connected between the vehicle body and the vehicle exterior component for moving the vehicle exterior component to any position between a fully extended position and retracted position;
   an actuator connected to the at least one movable link arrangement for driving the movable link arrangement and the vehicle exterior component between the fully extended position and the fully retracted position;
   a fixed link of the at least one movable link arrangement connected to the vehicle body;
   a base link of the at least one movable link arrangement connected to the vehicle exterior component;
   a driven link of the at least one movable link arrangement pivotally connected between the base link and the fixed link, wherein the driven link has at two driven link connections;
   a follower link of the at least one movable link arrangement pivotally connected between the base link in the fixed link, wherein the follower link has at least two follower link connections; and
   wherein each at least two driven link connections, at least two follower link connections all include a composite bushing having a body with an aperture formed there through, the body being formed of a continuous fiber and a resin material that circumscribes an inner layer of friction reduced material and a rotatable pin positioned through the aperture of the body in contact with the inner layer;
   wherein the continuous fiber is one selected from the group consisting essentially of polyparaphenylene terephthalamide, carbon fiber, glass fiber and combinations thereof, and
   wherein the resin material is one selected from the group consisting essentially of epoxy polyurethane and combinations thereof.

22. The movable link arrangement of claim 21, wherein the vehicle exterior component is one selected from the group consisting of a running board, step, spoiler and underbody air deflector.

23. The movable link arrangement of claim 21, wherein the inner layer of friction reduced material is polytetrafluoroethylene.

24. The movable link arrangement of claim 21, wherein the body of the composite bushing has a flange extending perpendicular to the aperture.

* * * * *